United States Patent Office 3,357,972
Patented Dec. 12, 1967

3,357,972
1-OXYGENATED 1,2,3,3a,3b,4,5,9,11,11a,11b,12,13,13a-TETRADECAHYDRO - 11a,13a - DIMETHYLCYCLOPENTA[7,8]PHENANTHRO[2,3 - c][1,2,6]THIADIAZINE 8,8-DIOXIDES AND CONGENERS
James R. Deason, Skokie, Ill., assignor to G. D. Searle & Co., Chicago, Ill., a corporation of Delaware
No Drawing. Filed Mar. 2, 1966, Ser. No. 531,080
6 Claims. (Cl. 260—239.5)

This invention relates to 1-oxygenated 1,2,3,3a,3b,4,5,9,11,11a,11b,12,13,13a-tetradecahydro - 11a,13a - dimethylcyclopenta[7,8]phenanthro[2,3-c][1,2,6]thiadiazine 8,8-dioxides and congeners, and to processes for the preparation thereof. More particularly, this invention provides new, useful, and unobvious chemical compounds of the formula

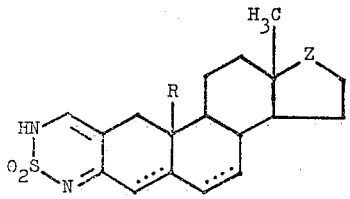

wherein the dotted lines represent optional double bonds, R represents hydrogen or a lower alkyl radical, and Z represents a carbonyl radical or a radical of the formula

in which R' represents hydrogen or a lower alkanoyl radical and R" represents hydrogen or a lower alkyl radical.
Those skilled in the art will recognize that lower alkanoyl radicals are radicals of the formula —CO-lower alkyl and lower alkyl radicals are monovalent, saturated, acyclic straight- or branched-chain, hydrocarbon groupings of empirical formula

wherein $n$ represents a positive integer less than 8. Typical lower alkyl radicals are methyl, ethyl, propyl, isopropyl, butyl, isobutyl, sec-butyl, tert-butyl, pentyl, neopentyl, hexyl, isohexyl, heptyl, etc.

The compounds to which this invention relates are useful by reason of their valuable pharmacological properties. Thus, for example, they are anti-bacterial agents effective against *B. subtilis*, *E. coli*, and *D. pneumoniae*; anti-protozoal versus *Tetrahymena gelleii*; and anti-germinative in respect of Dicotyledoneae. They also counteract inflammatory edema.

Preparation of the subject compounds proceeds by heating an appropriate 2-hydroxymethylene compound of the formula

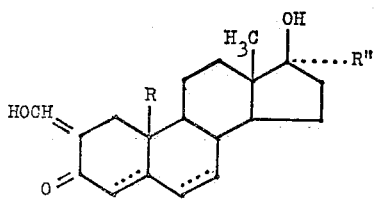

(R, R", and the dotted lines retaining the meanings previously assigned) with sulfamide in methanol saturated with hydrogen chloride and esterifying the resultant polyhydro - 1 - hydroxycyclopenta[7,8]phenanthro[2,3-c][1,2,6]thiadiazine 8,8-dioxide if and as desired by heating with a lower alkanoic acid anhydride or chloride

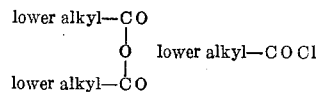

in the presence of pyridine or, optionally, oxidizing the enformulated 1-hydroxy products wherein R" represents hydrogen by contacting with chromic anhydride and sulfuric acid in an acetonic medium to produce the 1-oxo compounds of the invention.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted. Specific rotations are referred to the D line of sodium.

EXAMPLE 1

*1,2,3,3a,3b,4,5,9,11,11a,11b,12,13,13a - tetradecahydro-1-hydroxy - 11a,13a-dimethylcyclopenta[7,8]phenanthro [2,3-c][1,2,6]thiadiazine 8,8-dioxide*

Hydrogen chloride is passed through a solution of 33 parts of 17β-hydroxy-2-hydroxymethyleneandrost-4-en-3-one and 10 parts of sulfamide in 790 parts of methanol for 30 minutes, whereupon the flow of gas is stopped and the resultant mixture heated at the boiling point under reflux for 30 minutes, then allowed to stand at room temperatures overnight. A yellowish-green solid precipitates. Solvent is removed by vacuum distillation. The residue is triturated and washed with acetone, then dried in air to give 1,2,3,3a,3b,4,5,9,11,11a,11b,12,13,13a - tetradecahydro-1 - hydroxy - 11a,13a - dimethylcyclopenta[7,8]phenanthro[2,3-c][1,2,6]thiadiazine 8,8-dioxide melting at approximately 299–300°. The specific rotation of a 1.025% solution in pyridine at 26° is −176°. The product has the formula

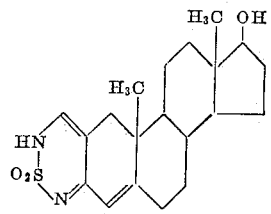

EXAMPLE 2

*1 - acetoxy - 1,2,3,3a,3b,4,5,9,11,11a,11b,12,13,13a-tetradecahydro - 11a,13a - dimethylcyclopenta[7,8]phenanthro[2,3-c][1,2,6]thiadiazine 8,8-dioxide*

A solution of 5 parts of 1,2,3,3a,3b,4,5,9,11,11a,11b, 12,13,13a-tetradecahydro-1-hydroxy - 11a,13a - dimethylcyclopenta[7,8]phenanthro[2,3-c][1,2,6]thiadiazine 8,8-dioxide in 25 parts of acetic anhydride and 25 parts of pyridine is heated at around 90° for 1 hour, then poured into 5 volumes of ice water. Insoluble solids are filtered off and crystallized from a mixture of acetone and methanol, using decolorizing charcoal in process. Recrystallization from methanol alone, again using decolorizing charcoal, affords 1-acetoxy-1,2,3,3a,3b,4,5,9,11,11a,11b, 12,13,13a-tetradecahydro - 11a,13a - dimethylcyclopenta [7,8]phenanthro[2,3-c][1,2,6]thiadiazine 8,8-dioxide as a yellow monomethanol solvate melting at 282–284°. Specific rotation of a 1.002% solution of the methanolate in chloroform at 23° is −168.5°. Solvent of crystallization is removed by prolonged heating in vacuo. The non-solvated product has the formula

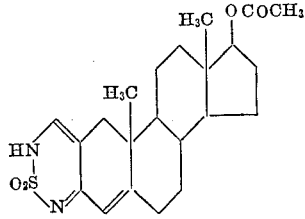

EXAMPLE 3

1,2,3,3a,3b,4,5,9,11,11a,11b,12,13,13a - tetradecahydro-11a,13a - dimethyl - 1-oxocyclopenta[7,8]phenanthro-[2,3-c][1,2,6]thiadiazine 8,8-dioxide To 50 parts of 1,2,3,3a,3b,4,5,9,11,11a,11b,12,13,13a-tetradecahydro - 1 - hydroxy-11a,13a-dimethylcyclopenta[7,8]phenanthro[2,3 - c][1,2,6]thiadiazine 8,8 - dioxide suspended in 790 parts of acetone is added a solution prepared by dissolving 14 parts of chromic anhydride in 21 parts of concentrated sulfuric acid and 28 parts of water. The resultant mixture is stirred 5 minutes and then poured into 2500 parts of water. The resultant clear solution is diluted with just sufficient additional water to induce cloudiness, then refrigerated. The insoluble solid which precipitates is filtered off and dried in air. The product thus isolated is 1,2,3,3a,3b,4,5,9,11,11a,11b,12,13,13a-tetradecahydro - 11a,13a - dimethyl-1-oxocyclopenta[7,8]-phenanthro[2,3 - c][1,2,6]thiadiazine 8,8-dioxide melting at approximately 301°. It has the formula

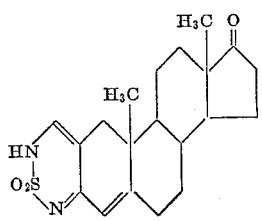

EXAMPLE 4

1,2,3,3a,3b,4,5,5a,6,9,11,11a,11b,12,13,13a - hexadecahydro - 1 - hydroxy - 1,11a,13a-trimethylcyclopenta[7,8]phenanthro[2,3 - c][1,2,6]thiadiazine 8,8-dioxide Substitution of 35 parts of 17β-hydroxy-2-hydroxymethylene - 17α-methylandrostan-3-one for the 17β-hydroxy - 2-hydroxymethyleneandrost-4-en-3-one called for in Example 1 affords, by the procedure there detailed, 1,2,3,3a,3b,4,5,5a,6,9,11,11a,11b,12,13,13a - hexadecahydro - 1 - hydroxy - 1,11a,13a - trimethylcyclopenta[7,8]phenanthro[2,3 - c][1,2,6]thiadiazine 8,8-dioxide, having the formula

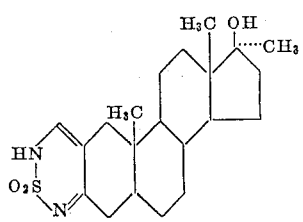

EXAMPLE 5

1 - ethyl - 1,2,3,3a,3b,9,11,11a,11b,12,13,13a - dodecahydro - 1-hydroxy-11a,13a,dimethylcyclopenta[7,8]phenanthro[2,3-c][1,2,6]thiadiazine 8,8-dioxide Substitution of 35 parts of 17α-ethyl-17β-hydroxy-2-hydroxymethyleneandrosta - 4.6-dien-3-one for the 17β-hydroxy-2-hydroxymethyleneandrost-4-en-3-one called for in Example 1 affords, by the procedure there detailed, 1-ethyl - 1,2,3,3a,3b,9,11,11a,11b,12,13,13a - dodecahydro-1 - hydroxy - 11a,13a-dimethylcyclopenta[7,8]phenanthro[2,3-c][1,2,6]thiadiazine 8,8-dioxide, the formula of which is

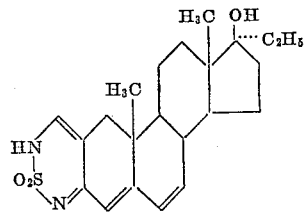

What is claimed is:
1. A compound of the formula

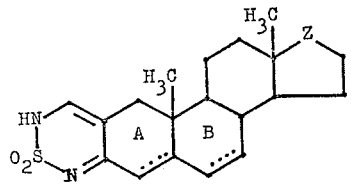

wherein the dotted line in ring A represents an optional double bond, the dotted line in ring B represents an optional double bond when there is a double bond in ring A, and Z represents a member of the class consisting of the carbonyl radical and a radical of the formula

wherein R' represents a member of the class consisting of hydrogen and a radical of the formula —CO-lower alkyl and R" represents a member of the class consisting of hydrogen and an alkyl of the formula $-C_nH_{2n+1}$ wherein n represents a positive integer less than 4.

2. A compound according to claim 1 which is 1,2,3,3a,3b,4,5,9,11,11a,11b,12,13,13a - tetradecahydro - 1 - hydroxy - 11a,13a - dimethylcyclopenta[7,8]phenanthro[2,3-c][1,2,6]thiadiazine 8,8-dioxide.

3. A compound according to claim 1 which is 1-acetoxyl - 1,2,3,3a,3b,4,5,9,11,11a,11b,12,13,13a - tetradecahydro - 11a,13a - dimethylcyclopenta[7,8]phenanthro[2,3-c][1,2,6]thiadiazine 8,8-dioxide.

4. A compound according to claim 1 which is 1,2,3,3a,3b,4,5,9,11,11a,11b,12,13,13a - tetradecahydro - 11a,13a - dimethyl - 1 - oxocyclopenta[7,8]phenanthro[2,3-c][1,2,6]thiadiazine 8,8-dioxide.

5. A compound according to claim 1 which is 1,2,3,3a,3b,4,5,5a,6,9,11,11a,11b,12,13,13a - hexadecahydro-1-hydroxy - 1,11a,13a - trimethylcyclopenta[7,8]phenanthro[2,3c-][1,2,6]thiadiazine 8,8-dioxide.

6. A compound according to claim 1 which is 1-ethyl-1,2,3,3a,3b,9,11,11a,11b,12,13,13a - dodecahydro - 1 - hydroxy - 11a,13a - dimethylcyclopenta[7,8]phenanthro[2,3-c][1,2,6]thiadiazine 8,8-dioxide.

References Cited
UNITED STATES PATENTS
3,135,741   6/1964   Clarke _____ 260—239.5

LEWIS GOTTS, *Primary Examiner.*

T. MESHBESHER, *Assistant Examiner.*